United States Patent
McGee et al.

(10) Patent No.: US 8,292,560 B2
(45) Date of Patent: Oct. 23, 2012

(54) ANCHOR DEVICE WITH DOUBLE-SECTIONED HEAD AND METHOD OF USING THE SAME

(75) Inventors: Thomas McGee, South Lyon, MI (US); Frank Neri, Saugus, CA (US)

(73) Assignee: AVK Industrial Products, Valencia, CA (US)

(*) Notice: Subject to any disclaimer, the term of this patent is extended or adjusted under 35 U.S.C. 154(b) by 317 days.

(21) Appl. No.: 12/589,420

(22) Filed: Oct. 22, 2009

(65) Prior Publication Data

US 2010/0101177 A1  Apr. 29, 2010

Related U.S. Application Data

(60) Provisional application No. 61/197,215, filed on Oct. 23, 2008.

(51) Int. Cl.
*F16B 13/04* (2006.01)

(52) U.S. Cl. ............................................. 411/34; 411/42

(58) Field of Classification Search ............... 411/34, 411/501, 38–40, 42
See application file for complete search history.

(56) References Cited

U.S. PATENT DOCUMENTS

| | | | |
|---|---|---|---|
| 2,277,885 A | 3/1942 | Rodanet | |
| 2,753,610 A | 7/1956 | Miller | |
| 2,991,858 A | 7/1961 | Taylor et al. | |
| 3,014,563 A * | 12/1961 | Bratton | 403/167 |
| 3,230,818 A * | 1/1966 | Siebol | 411/34 |
| 3,304,830 A * | 2/1967 | Shackelford | 411/500 |
| 3,834,270 A | 9/1974 | Triplett et al. | |
| 3,916,970 A * | 11/1975 | Owens | 152/379.4 |
| 4,182,216 A * | 1/1980 | DeCaro | 411/34 |
| 4,309,136 A * | 1/1982 | Talan | 411/36 |
| 4,580,936 A | 4/1986 | Francis et al. | |
| 4,635,310 A | 1/1987 | Kendall | |
| 4,869,629 A | 9/1989 | Witzigman | |
| 5,651,649 A | 7/1997 | Sadri et al. | |
| 5,658,107 A * | 8/1997 | Smith | 411/34 |
| 5,659,005 A * | 8/1997 | Marrocco et al. | 528/183 |
| 6,447,399 B1 | 9/2002 | Denham | |
| 6,746,191 B2 * | 6/2004 | Edland | 411/34 |
| 7,241,097 B2 * | 7/2007 | Dembowsky et al. | 411/369 |
| 7,841,816 B2 * | 11/2010 | Jodeleit et al. | 411/34 |
| 2008/0038090 A1 * | 2/2008 | Figge et al. | 411/433 |

* cited by examiner

*Primary Examiner* — Gary Estremsky
(74) *Attorney, Agent, or Firm* — James M. Duncan, Esq.; Klein, DeNatale, Goldner, Cooper, et al.

(57) ABSTRACT

A modified anchor device for attaching a structure to a thin-walled work piece allows a structure, such as a luggage or utility rack, to be attached to a work piece, such as an automobile roof, without threaded fasteners connecting the structure to the work piece. The anchor device has an double-sectioned head having an upper head member and a lower head member The upper head member extends above the surface of the work piece a sufficient distance such that the upper head member engages the top surface of the structure, thus retaining the bottom side of the structure in face-to-face contact with the top side of the work piece.

6 Claims, 4 Drawing Sheets

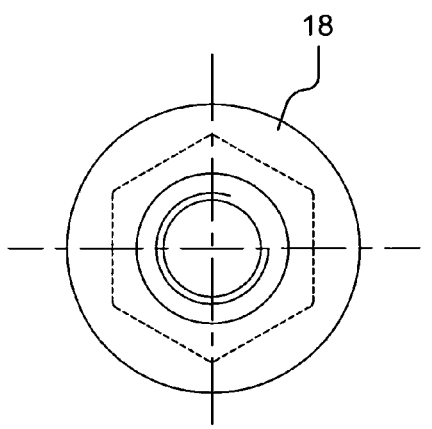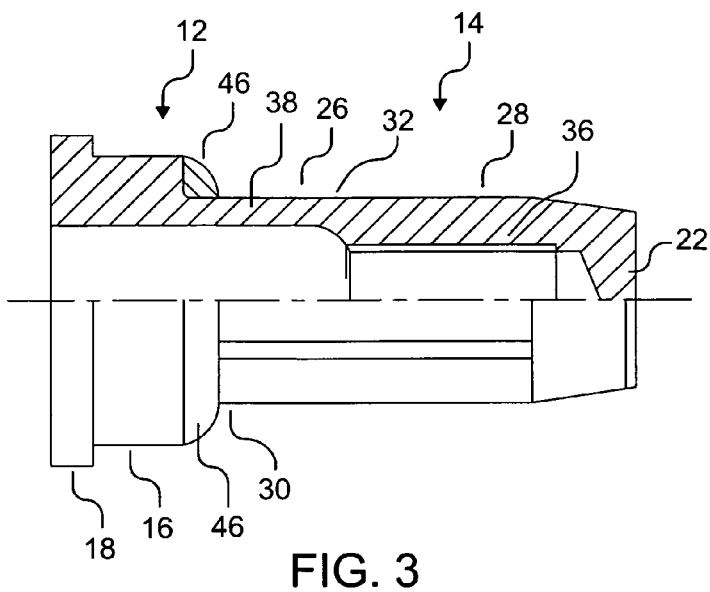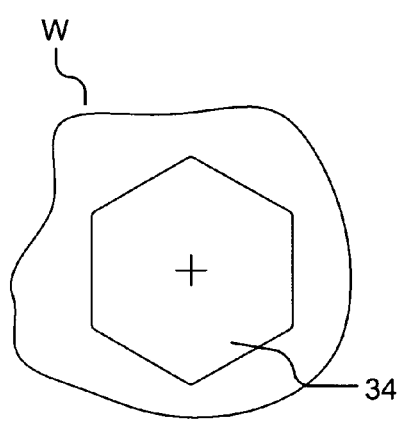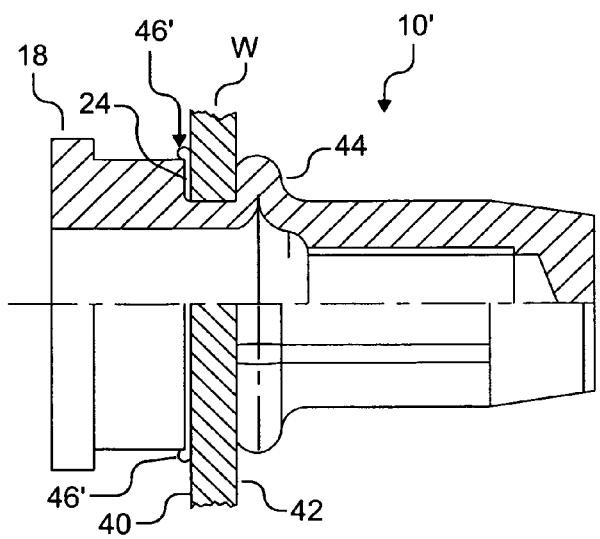
FIG. 4
FIG. 3
FIG. 5
FIG. 6

ANCHOR DEVICE WITH DOUBLE-SECTIONED HEAD AND METHOD OF USING THE SAME

CROSS-REFERENCE TO RELATED APPLICATION

U.S. Provisional Application No. 61/197,215 for this invention was filed on Oct. 23, 2008 for which these inventors claim domestic priority.

BACKGROUND OF THE INVENTION

The disclosed device relates generally to thin wall anchor devices, specifically threaded inserts and rivnuts (collectively "anchor devices"). The present device comprises an anchor device comprising a double sectioned head member, the head member comprising an upper head member which extends above the surface of a work piece. The upper head member is used to attach a structure to the work piece, where the upper head member is received by a slot or aperture of the structure, to make the attachment. The use of the present device may eliminate or reduce the need for separate fasteners to secure the structure to the work piece and may expedite the attachment of the structure to the work piece. In one embodiment, the anchor has a smooth bore and may be installed by means of a breakstem which shears upon application of a sufficient axial force. However, if desired, the disclosed anchor device may comprise threads such that a threaded fastener may be connected to the anchor device for either installing the anchor device and/or for providing threads if it desired to utilize the anchor device for attaching threaded fasteners as may be desired for securing the structure to the work piece.

It is known to attach a structure to the surface of a work piece by means of threaded fasteners which are made up into threaded anchors pre-installed within the work piece. Once holes have been created in the work piece, two steps are required to attach the structure. First, the threaded anchors are installed into the work piece by inserting the anchors into the existing holes and applying an axial force to the anchor to cause a portion of the body of the anchor to deform, thus retaining the anchor in the work piece. Second, the structure is attached to the work piece, typically by threaded fasteners which are made up into threads in the anchor. However, this process can be time consuming, can complicate assembly line fabrication of the completed article, and requires a separate fastener for each anchor. For example, for roof racks installed to the roofs of motor vehicles, the anchors are first installed in the roof of the vehicle. Second, the roof rack is attached to the roof of the vehicle with fasteners made up into each of the threaded anchors. In addition to the separate steps required to install the roof rack, this operation typically requires separate tools for installing the anchor devices and for attaching the roof rack to the vehicle roof with fasteners.

SUMMARY OF THE INVENTION

The disclosed device is a modified rivnut or threaded insert (hereinafter "anchor device") for attaching a structure to a thin-walled work piece. The work piece will have a first side, for which access is available, and a second side, which may be a blind side where access is not available. It is to be understood that the term "work piece" as used in this specification refers to any material for which it is desirable to use any of the disclosed embodiments of this device. Typically, the materials for which embodiments of the disclosed anchor device has the greatest utility are blind applications for thin walled materials such as sheet metal or sheet plastic. In installations where there is only ready access to one side of a work piece, it is necessary to employ anchors which may be completely deployed and installed from the visible side of the work piece.

A particular application for which species of the disclosed invention may be utilized is for attaching components of a roof rack, typically the rails, or similar apparatus to the sheet metal top of a vehicle, such as an automobile. For the known method of installing the rails of a roof rack of an automobile, an opening is placed in the material of the vehicle roof by drilling or punching, and a threaded anchor device is installed within the resulting hole. The anchor device is thereafter installed by application of an axial force by reciprocation or rotation of a stud attached to a portion of the anchor device. The application of axial force causes a portion of the sleeve section of the anchor to deform into a bubble on the second side of the work piece, such that the thin wall of the work piece is sandwiched on the second side by the bubble and by the head of the anchor device on the first side, thereby preventing the withdrawal of the anchor from the work piece.

In contrast to the prior art, the present apparatus does not necessarily require a fastener to secure the structure, such as the roof rack, to the work piece, such as the roof of the vehicle. The present anchor device comprises a double sectioned head comprising an upper head member and a lower head member. Once the anchor device is installed, the upper head member extends above the surface of the work piece a sufficient distance such that the upper head member may penetrate an aperture of the structure. The structure may comprise a slot where the slot has a first width which is larger than the diameter of the upper head member, and a second width, adjacent to the first width, the second width smaller than the diameter of the upper head member. Once the upper head member penetrates the first width of the slot, the structure and work piece may be manipulated to move the structure with respect to the work piece, or vice-versa, such that the upper head member abuts the portion of slot having the second (i.e., narrower) width. The structure may further comprise a "ramped" section from the first width to the second width, where tension is applied to the anchor device as the upper head member is manipulated from the first width to the second width, thus increasing the preload holding the structure to the work piece.

As an alternative method of installation, the anchor device may be simultaneously placed within an aperture of the structure and the hole in the work piece, such that the upper head of the anchor device, which has a larger diameter than the aperture in the structure, abuts the top surface of the structure, but the remainder of the anchor device, which depends from the bottom of the upper head, extends through the aperture of the structure, with sufficient length left for insertion of a sleeve section of the anchor device into the hole in the work piece. The anchor device is thereafter installed by activation of an installation tool which causes a portion of the sleeve section to be deformed on the blind side of the work piece creating a bubble. The anchor device attaches the structure to the work piece at the same time the anchor device is installed within the work piece.

Embodiments of the disclosed anchor device may include a deformable seal member, which seal member is adjacent to a shoulder formed by the terminus of the lower head of the device, wherein during installation the seal member deforms and is held between the work piece and the shoulder, thus creating a seal between the anchor device and the exterior surface of the work piece. In the case of a roof rack, the seal member prevents or restricts moisture from penetrating into the hole into which the sleeve member of the anchor device has expanded, thereby reducing corrosion of the anchor device and in the roof of the vehicle.

BRIEF DESCRIPTION OF THE DRAWINGS

FIG. 3 is a partial cross sectional view of an embodiment of the disclosed anchor device.

FIG. 4 a top view of an embodiment of the disclosed anchor device.

FIG. 5 is a top view of a preinstalled hexagonal aperture in a work piece prepared to receive an embodiment of the disclosed anchor device.

FIG. 6 is a partial cross sectional view of an embodiment of the disclosed anchor device after it has been installed in a work piece.

DETAILED DESCRIPTION

It is to be appreciated that the dimensions, materials, finishes, etc., called out within the drawings are for specific species of the device, and are provided by way of example only. Embodiments of the invention are not limited to the dimensions, materials, finishes or other detail set forth within the drawings.

Figure 1:
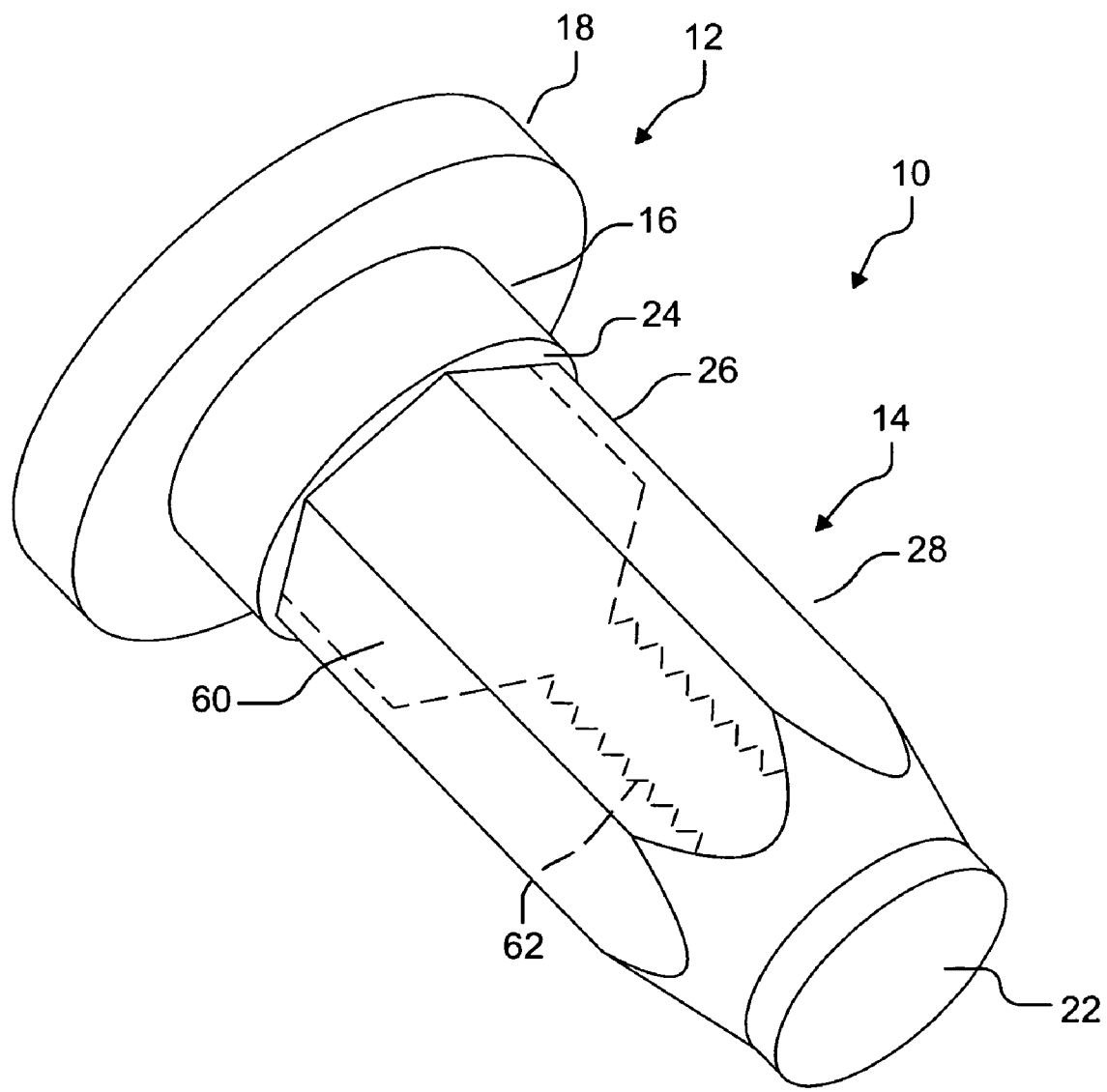
FIG. 1 is an isometric view of an embodiment of the disclosed anchor device.
Figure 2:
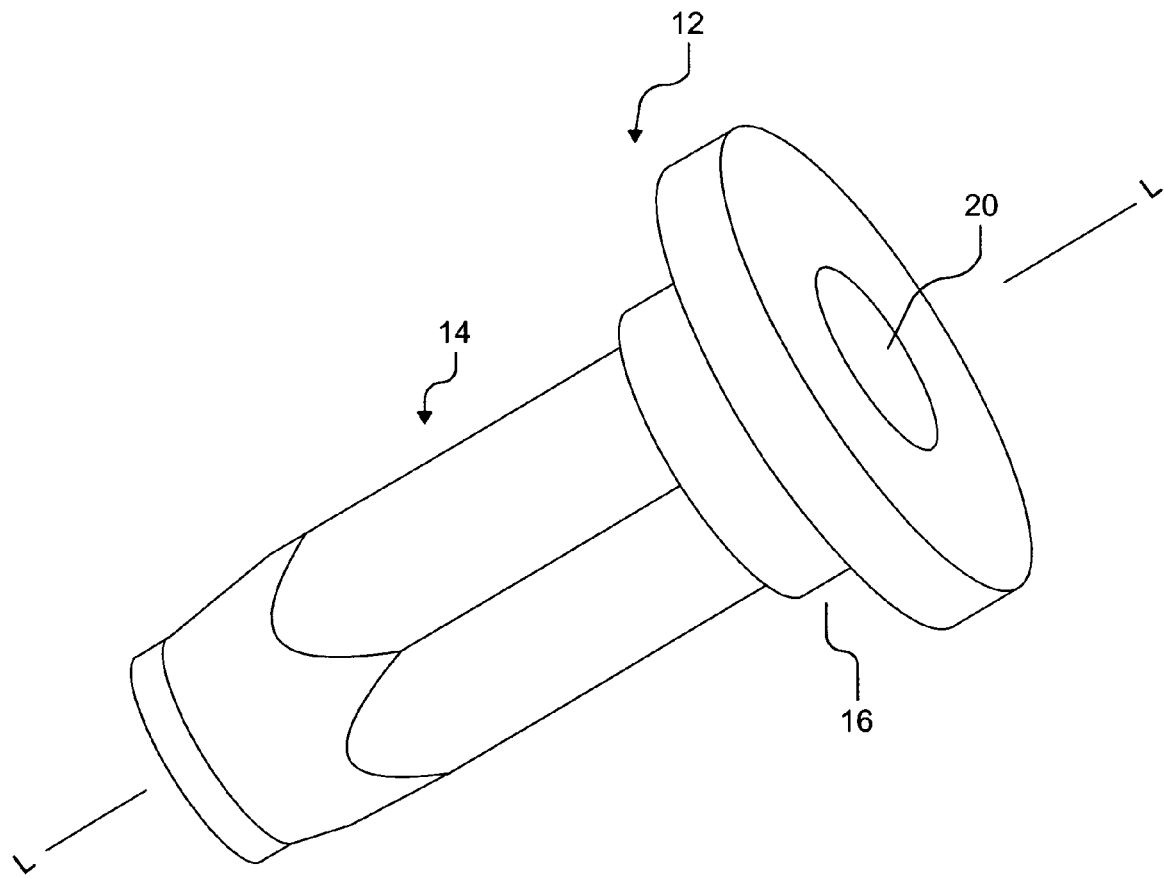
FIG. 2 is a second isometric view of an embodiment of the disclosed anchor device.

Referring now to the figures, FIG. 1 shows an isometric view of embodiment of the disclosed anchor device 10 in an uninstalled condition. It is to be appreciated that the disclosed anchor device 10 may be manufactured from carbon steel and various alloys in a cold-headed extrusion process, with no machining required.

Anchor device 10 comprises a double sectioned head member 12 and a sleeve section 14. Double-sectioned head member 12 distinguishes the present invention from other anchor devices in that double-sectioned head member 12 comprises a lower head member 16 which depends from upper head member 18. This configuration allows upper head member 18 to extend sufficiently above work piece W to allow a wall of a structure, such as a roof rack, to be contained between the bottom of upper head member 18 and the top surface of work piece W. FIG. 6 shows how upper head member 18 extends away from work piece W after the anchor device 10' has been installed. Head member 12 comprises a circular opening 20 which has a center axis L which coincides with the center axis of the anchor device 10. Circular opening 20 extends through much of the entire length of the anchor device 10, and may either terminate at a closed end 22, or continue throughout the entire length of the device such that the device is open-ended. Head member 12 transitions into sleeve section 14 at shoulder 24.

Sleeve section 14 comprises a mostly hollow body having a first section 26 and an axially adjacent second section 28. First section 26 comprises a proximal end 30, which transitions into head member 12. First section 26 further comprises a distal end 32 wherein the first section 26 transitions into second section 28, which is indicated by an increasing wall thickness of the sleeve section 14. First section 26 comprises a collapsible counter-bore area 60 between proximal end 30 and distal end 32. Sleeve section 14 will typically have a non-circular exterior shape to prevent the anchor device from rotating within the opening 34 of work piece W. For example, sleeve section 14 may have a hexagonal profile to correspond with the hexagonal opening 34 in work piece W indicated in FIG. 5. However, it is to be appreciated that other non-round exterior shapes will also work to prevent the sleeve section from rotating within the opening 34.

Second section 28 comprises a hollow cylinder which may have a closed end 22. As shown best in FIG. 3, the thickness of wall 36 in the second section 28 is greater than the thickness of wall 38 of first section 26, thereby allowing the first section to preferentially collapse as shown in FIG. 6 when the anchor device 10 is installed by application of a linear force. Second section 28 may comprise threads 62. In the utilization of the present device for attaching a roof rack to the top of a vehicle, an acceptable thread is an M6 thread.

An installed anchor device 10' is shown in FIG. 6. The anchor device is typically installed in a opening 34 in a work piece W, where the work piece has a visible side 40 and a blind side 42. As depicted in FIG. 6, when the anchor device 10' has been installed in work piece W, the installed anchor device is retained within the opening 34 of the work piece by the shoulder 24 of double-sectioned head member 12 on the visible side 40, and bubble 44 which is formed on the blind side 42 by the collapse of first section 26. Bubble 44 prevents the withdrawal of anchor device 10' from the work piece W.

Anchor device 10 may further comprise a seal member 46 which is attached to or adjacent to shoulder 24 of head member 12. As depicted in FIG. 6, when anchor device 10' is installed in work piece W, seal member 46' plastically deforms between shoulder 24 and the surface of work piece W, creating a seal which restricts liquid flow into opening 34 to assist in avoiding corrosion in the work piece. Seal member 46 may comprise various elastomeric materials which have appropriate mechanical properties for plastically deforming and flowing upon being subjected to the compression applied between the shoulder 24 and the work piece W when the anchor device is installed by application of linear force.

The anchor device 10 is fabricated from metal and metal alloy materials which have mechanical properties suitable for plastic deformation, such that the first section will collapse yet the second section retains its integrity. Appropriate materials are various carbon steels and alloys.

Figure 7:
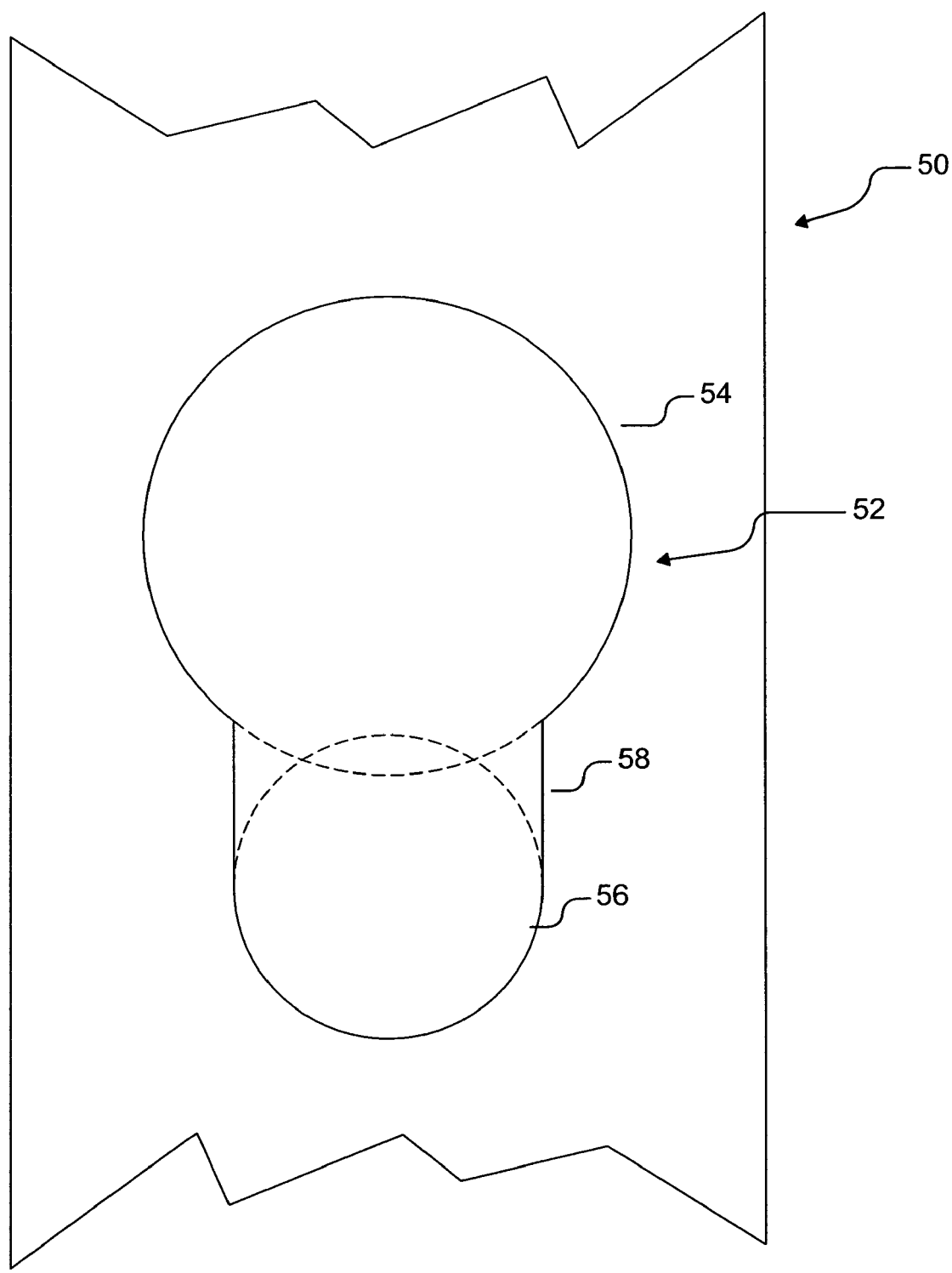
FIG. 7 is a view of a slot in a structure which may be utilized for insertion of the upper head of an embodiment of the disclosed anchor device.

FIG. 7 schematically shows a portion of a structure 50 which may be attached to work piece W with embodiments of the presently disclosed anchor device. The structure 50 has a top side, shown in FIG. 7, and a bottom side, which facially engages work piece W upon installation, and a slot 52. Slot 52 comprises a first aperture 54 having a width larger than the diameter of upper head member 18. Slot 52 has a second aperture 56, which is connected to first aperture 54 by transition section 58. The first aperture 54, the second aperture 56 and the transition section 58 all extend from the top side through to the bottom side of structure 50. Second aperture 56 is large enough to receive lower head member 16, but smaller than the diameter of upper head member 18, thus preventing the withdrawal of upper head member 18 from structure 50. Once upper head member 18 has been inserted through first aperture 54, the structure 50 being attached to the work piece W is thereafter slid along the surface of the work piece such that the integral head engages the portion of slot having the second (i.e., narrower) width. The top surface of structure 50 may comprise a ramp which, as the position of upper head member 18 changes from adjacent to first aperture 54 to second aperture 56, applies stress to the installed anchor device 10', thus further securing structure 50 to work piece W.

A structure 50, such as a roof rack, may be attached to a work piece, such as the roof of a vehicle, by the following procedure. The anchor device 10 is placed within an opening 34 in the workpiece W. Axial force is applied by an installation tool to the anchor device 10 thereby deforming the first section 28. The anchor device 10 may be installed with an installation tool which comprises a threaded stud, where the threaded stud is either rotated, thereby tightening into threads 62 located in the second section 28 of the anchor device, and thus imposing a linear force to the anchor device, causing the first section 28 to collapse as the rotation of the stud pulls the second section 28 toward the blind side 42 of the work piece. Alternatively, the linear force may be applied by reciprocation of the installation tool, such that the threaded stud is pulled toward the tool. As yet another alternative, the installation tool may be attached to a breakstem which is attached to the anchor device 10, where the installation tool applies a longitudinal load to a breakstem attached within the anchor device, thereby causing the anchor device to deform until the breakstem shears upon application of sufficient applied axial force. In this embodiment, the anchor device 10 need not comprise threads for attaching a threaded stud.

Following installation of the anchor device 10' in a work piece W as described above, upper head member 18 extends a sufficient distance from the work piece W so the upper head may engage slot 52 of the structure 50. As can be appreciated, the thickness of structure 50 should be sized such that there is sufficient space for upper head member 18 to be received through first aperture 54 such that the bottom of upper head member 18 clears the top of structure 50, and allowing the structure and/or the work piece to be moved with respect to the other such that upper head member 18 is adjacent to second aperture 56, and most of lower head member 16 is disposed within section aperture 56, with shoulder 24 engaging the work piece W. Structure 50 may comprise, among other things, a rail member of a roof rack for automobile or other vehicle. As can be appreciated, a rail member may have a plurality of slots, each slot corresponding to a upwardly protruding upper head member 18 of a species of the device. The rail member may be slid such that the smaller opening, second aperture 56, is locked from upward movement and sideways movement by the upper head member 18. If anchor device 10 comprises threads, threaded fasteners may be made up into the threads for securing additional structures as desired.

As an alternative method of installation, an embodiment of the anchor device 10 may be simultaneously placed within an aperture 56' of structure 50 and the opening 34 in the work piece W, such that head member 12 of the anchor device, which has a larger diameter than the aperture 56', abuts the top surface of the structure, with the sleeve section 14 of the anchor device extending through the aperture of the structure, with sufficient length left for insertion into the opening 34 of the work piece, and disposition of the first section 26 and the second section 28 on the blind side 42 of the work piece W. Once sleeve section 14 is within the opening 34 of the work piece, the anchor device 10 may be installed by activation of an installation tool, as described above. Thus, once a portion of the anchor device is deformed on the blind side of the work piece, the anchor device attaches the structure to the work piece at the same time the anchor device is installed within the work piece.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A combination anchor device, structure, and work piece, wherein the anchor device is used for attaching the structure to the work piece, the structure having a top side and a bottom side, the structure further comprising a first aperture and a second aperture, the first aperture and the second aperture connected by a transition section, the first aperture, the second aperture, and the transition section extending through from the top side to the bottom side, the work piece having a first side and a second side and an opening extending from the first side to the second side, wherein, upon attachment, the bottom side of the structure facially engages the first side of the work piece, wherein the anchor device comprises:

a double-sectioned head member comprising an upper head member and a lower head member depending from the upper head member, the lower head member comprising a first end attached to the upper head member and a second end comprising a shoulder adapted to engage the first side of the work piece, wherein the upper head member has a diameter smaller than the first aperture and larger than the second aperture, such that upon attachment of the structure to the work piece, the upper head member is retained by the top side of the structure adjacent to the second aperture, and the lower head member extends through the second aperture; and a hollow sleeve section depending from the second end of the lower head member, the sleeve section for insertion into the opening in the work piece, the sleeve section comprising a first section and an axially adjacent second section, the first section comprising a proximal end attached at the second end of the lower head member, and a distal end wherein the first section terminates and the second section begins, said first section further comprising a wall having a first thickness and said second section comprising a wall having a second thickness, wherein the second thickness is larger than the first thickness such that the first section preferentially collapses upon application of linear force to the sleeve section.

2. The anchor device of claim 1 wherein the second section comprises internal threads.

3. The anchor device of claim 1 wherein the shoulder which engages the first side of the work piece comprises a seal member.

4. The anchor device of claim 1 wherein the sleeve section comprises a first end depending from the second end of the lower head member and a distal end, the distal end of the sleeve section being closed.

5. The anchor device of claim 1 wherein the opening has a non-circular shape and the sleeve section has a non-circular exterior shape.

6. The anchor device of claim 5 wherein the opening is hexagonal and the sleeve section has a hexagonal profile.

* * * * *